(12) United States Patent
Henigman et al.

(10) Patent No.: US 11,267,636 B2
(45) Date of Patent: Mar. 8, 2022

(54) ENVIROTRAY INSERT FOR PROTECTING AN OBJECT WITHIN AN OUTER CONTAINER

(71) Applicant: General Fibre Products Corp., New Hyde Park, NY (US)

(72) Inventors: Dušan Henigman, New Hyde Park, NY (US); Stuart Shrode, New Hyde Park, NY (US)

(73) Assignee: GENERAL FIBRE PRODUCTS CORP., New Hyde Park, NY (US)

( * ) Notice: Subject to any disclaimer, the term of this patent is extended or adjusted under 35 U.S.C. 154(b) by 0 days.

(21) Appl. No.: 17/004,310

(22) Filed: Aug. 27, 2020

(65) Prior Publication Data
US 2021/0188515 A1    Jun. 24, 2021

Related U.S. Application Data

(60) Provisional application No. 62/953,297, filed on Dec. 24, 2019.

(51) Int. Cl.
  *B65D 81/133*   (2006.01)
  *B65D 65/46*    (2006.01)
(52) U.S. Cl.
  CPC ......... *B65D 81/133* (2013.01); *B65D 65/466* (2013.01); *B65D 2581/053* (2013.01)
(58) Field of Classification Search
  CPC ............... B65D 81/133; B65D 65/466; B65D 2581/053; B65D 5/5038
  USPC ....... 206/581, 486, 487, 485, 488, 562, 763, 206/765, 588, 589; 211/72, 73, 74
  See application file for complete search history.

(56) References Cited

U.S. PATENT DOCUMENTS

| | | | | | |
|---|---|---|---|---|---|
| 2,330,345 | A | * | 9/1943 | Elliott | B65D 71/72 206/419 |
| 3,095,086 | A | * | 6/1963 | Berg | B65D 5/5021 206/784 |
| 4,026,411 | A | * | 5/1977 | Johnson | B65D 5/504 206/784 |
| 4,194,617 | A | * | 3/1980 | Bandell | B65D 5/5038 206/581 |
| 5,385,238 | A | * | 1/1995 | Lancaster | B65D 5/5042 206/486 |
| 5,884,767 | A | * | 3/1999 | Peng | B65D 5/5253 206/485 |
| 6,301,860 | B1 | * | 10/2001 | Gunderman | A45D 40/0087 206/461 |
| 6,401,927 | B1 | * | 6/2002 | Sorensen | B65D 5/5286 206/562 |
| 6,474,473 | B2 | * | 11/2002 | Wong | B65D 5/5021 206/427 |
| 7,533,774 | B2 | * | 5/2009 | Zimmerman | A45C 11/24 206/387.14 |

(Continued)

*Primary Examiner* — Jacob K Ackun
(74) *Attorney, Agent, or Firm* — Scully, Scott, Murphy & Presser, P.C.

(57) ABSTRACT

Provided herein is a recyclable and biodegradable packaging insert for holding consumer goods in place within the packaging. In an embodiment, the recyclable packaging insert holds consumer goods which are cosmetics. A GFP Envirotray is designed to protect objects within an outer container (box) from impact or abrasion. Packaging is made from paper or fiber board, corrugated or solid paper board.

11 Claims, 5 Drawing Sheets

(56) References Cited

U.S. PATENT DOCUMENTS

| | | | | |
|---|---|---|---|---|
| 7,549,537 | B2* | 6/2009 | Hsu | B65D 5/5038 |
| | | | | 206/486 |
| 7,621,402 | B2* | 11/2009 | Sandow | B65D 5/52 |
| | | | | 206/232 |
| 8,272,509 | B1* | 9/2012 | McCutchen | B65D 5/46032 |
| | | | | 206/486 |
| 2002/0148744 | A1* | 10/2002 | Hsu | B65D 5/5052 |
| | | | | 206/320 |
| 2005/0279668 | A1* | 12/2005 | Nash | B65D 71/72 |
| | | | | 206/562 |
| 2008/0067106 | A1* | 3/2008 | Kuo | B65D 5/5069 |
| | | | | 206/588 |

* cited by examiner

ENVIROTRAY INSERT FOR PROTECTING AN OBJECT WITHIN AN OUTER CONTAINER

The present application claims priority to U.S. provisional application No. 62/953,297 filed 24 Dec. 2019, the entirety of which is incorporated by reference. The present invention relates to an environmentally friendly insert for securing items, particularly consumer goods, such as cosmetics, treatments or similar items in packaging.

BACKGROUND

Consumer good products, such as cosmetic or treatment products for human beautification purposes are well known and have been used by humans for thousands of years. In modern times, cosmetic and treatment products are bought by customers of cosmetic-product manufacturers, which are provided to customers in various types of packaging. While the packaging provides useful protective and decorative functions, packing in general is becoming problematic when it is non-recyclable, non-biodegradable and adds to our global environmental problems. For example, discarded cosmetic-product packaging adds to waste and pollution within the environment.

There is increasingly a growing concern about adapting human society to a more sustainable utilization of resources, such as more sustainable use of energy and materials, with an emphasis on reducing waste, and in particular, plastics-material waste. Notably, disposal of waste, such as plastics-material waste by way of dumping in ground or water bodies results in addition of plastics-material nanoparticles in soil and water bodies like rivers and oceans. Such addition of the plastics-material nanoparticles reduces fertility of soil and makes water unfit for drinking and other purposes. Recycling and re-use are important issues for sustainable utilization of resources which are used in making the cosmetic-product packaging, recycling and sustainability is more easily accomplished using paper-based products.

Therefore, there arises a need for a cosmetic-product packaging that not only provides protection for a given cosmetic product from a given manufacturer to a given customer, but aesthetically appeals and is useful to the given customer, such that the given customer retains and cherishes the cosmetic-product packaging for long term use, rather than merely discarding the cosmetic-product packaging at an earliest opportunity.

There is an ongoing need in the field of packaging for environmentally-friendly packaging and containers; particularly those configured for functioning as a tray for inserting into an outer packaging. There is a particular need for this in the cosmetic industry. Typically such inserts and other packaging materials are made of non-biodegradable plastic, and there is a need to move to paper based packaging material.

SUMMARY

Provided therefore herein is a recyclable and biodegradable packaging insert for holding consumer goods in place within a package. In an embodiment, the recyclable packaging insert holds consumer goods which are cosmetics or treatments. In an embodiment, the recyclable and biodegradable packaging insert is made of solid paper board or corrugated paper board. In another embodiment, the insert is a horizontally layered construction designed to secure said consumer goods efficiently and ergonomically.

In an embodiment, the present invention includes a recyclable and biodegradable packaging insert for retaining a consumer good in place within outer packaging. The insert is a tray with a topside and a bottomside, the topside comprising at least one aperture for retaining a consumer good therein, and the bottomside comprising an exterior vertically extending member and an interior vertically extending member. The exterior vertically extending member and the interior vertically extending members combine to form a multilayer reinforcement structure on the bottomside of the tray.

In an embodiment, the tray is horizontally oriented with the exterior vertically extending member and the interior vertically extending member each projecting substantially perpendicularly from the bottomside of the tray. In an embodiment, the topside is a substantially planar surface and the at least one aperture is recessed in from the planar surface in a mated shape, mated to a preselected consumer good in order to secure a selected consumer good.

In an embodiment, the recyclable and biodegradable packaging insert the mated shape of the at least one aperture has a depth which is a length just greater than half of a selected dimension of said selected consumer good which is placed in the at least one aperture. In yet another embodiment, the exterior vertically extending member forms a structural support along a perimeter of said packaging insert.

In another embodiment, the packaging insert is a rectangle and two exterior vertically extending members are located on opposing sides of the rectangle. In an embodiment, the interior vertically extending member forms a sidewall of said at least one aperture. In another embodiment, the exterior vertically extending member is affixed to the bottomside of the packaging insert by horizontal flanges extending from the exterior vertically extending member. The interior vertically extending member may be affixed to the horizontal flanges by second horizontal flanges extending from the interior vertically extending member and creating a layered structure on said bottom side of the packaging insert.

For a better understanding of the present invention, together with other and further objects and advantages, reference is made to the following detailed description, taken in conjunction with the accompanying examples, and the scope of the invention will be pointed out in the appended claims. The following detailed description is not intended to restrict the scope of the invention by the advantages set forth above.

DETAILED DESCRIPTION

The packaging insert of the present invention provides an easy to assemble, sturdy paper-based packaging insert for use in the cosmetic industry. The packaging insert is advantageous over the prior art because it is biodegradable and considerably faster and more economical from concept to supply than plastic.

As used herein, the term paperboard broadly refers to a thick paper-based material; i.e., paper with an increased structural element. While there is no rigid differentiation between paper and paperboard, paperboard is generally thicker (usually over 0.30 mm, 0.012 in) than paper, and has certain superior attributes such as foldability and rigidity. In a non-limiting definition, paperboard is a paper with a grammage above 250 g/m$^2$. Paperboard can be single- or multi-ply.

Paperboard can be easily cut and formed, is lightweight, and because it is strong, is used in packaging. Paperboard is sometimes referred to as cardboard, which is a generic, lay term used to refer to any heavy paper pulp-based board, however this usage is deprecated in the paper, printing and packaging industries as it does not adequately describe each product type. Paperboard can be corrugated (i.e., having a series of parallel ridges and furrows), or non-corrugated. In a preferred embodiment of the invention, the paperboard is corrugated.

As used herein, "recyclable" refers to an ability and likelihood of a material to reacquire to be re-used, and thus acquire the properties it had in its original state. It is an alternative to "conventional" waste disposal that can save material and help lower greenhouse gas emissions. Recycling can prevent the waste of potentially useful materials and reduce the consumption of fresh raw materials, thereby reducing: energy usage, air pollution (from incineration), and water pollution (from landfilling). Paper based products are more easily and more likely than plastic to be recyclable, and thus beneficial in use from this perspective.

As used herein, "biodegradable" refers to a plant based composition which is compostable and capable of disintegrating into natural elements in a compost environment, leaving no toxicity in soil or water.

A GFP Envirotray is designed to protect objects within an outer container (box) from impact or abrasion. Packaging is made from paper board or fiber board, which can be corrugated or solid paper board. A horizontal portion (face) of folded board is cut with apertures to match the cross sectional plane of the object (product) to be retained just above its equator to facilitate good retention. The retention is accomplished by a slight deformation of the cut aperture which returns to its normal state upon the retained object passing through it just beyond its equator.

Figure 1:
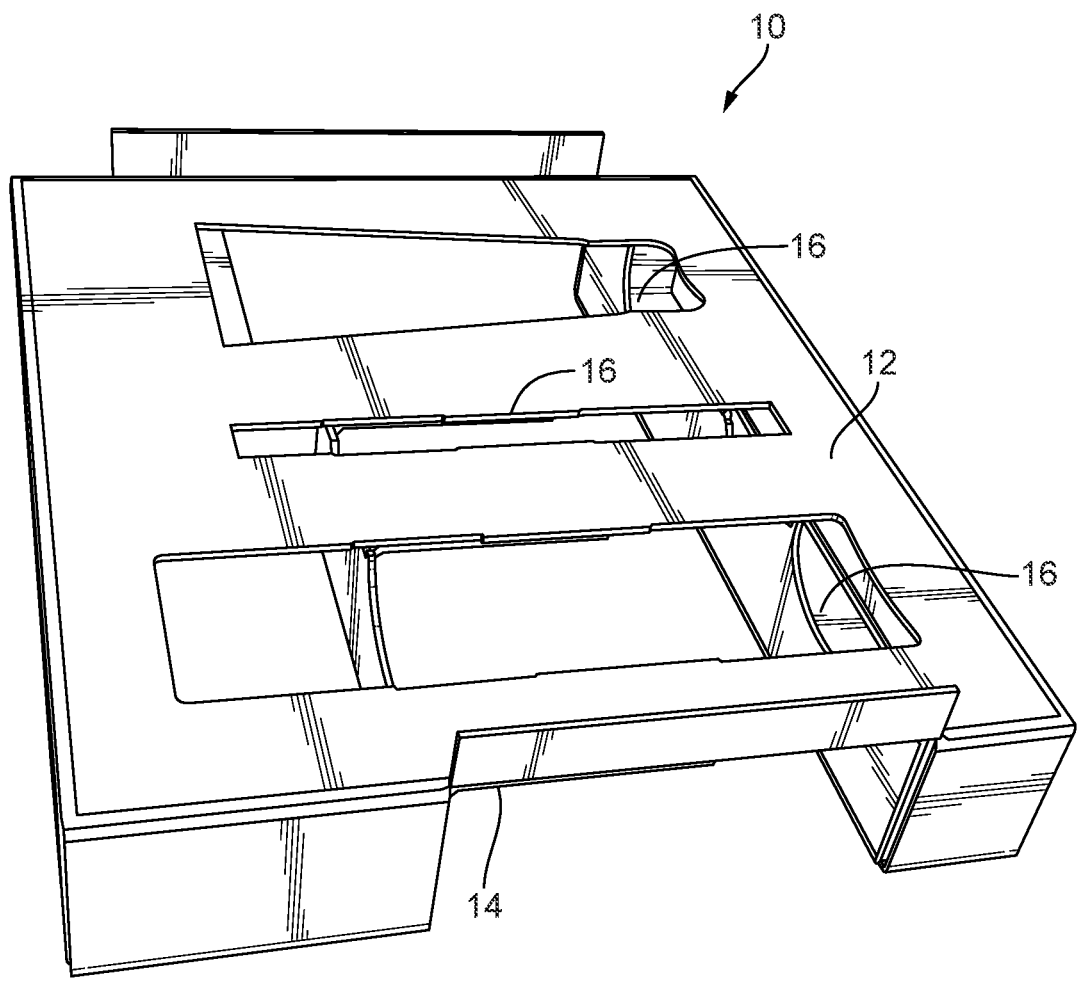
FIG. 1 shows an overview perspective of a packaging insert of the present invention.

With reference now to the drawings, FIG. 1 shows a top plan view of a recyclable and biodegradable packaging insert 10 of the present invention. A topside 12 is shown with an opposed bottomside 14 facing the opposite direction of topside 12. Topside 12 includes apertures 16 designed to retain consumer goods (not shown in FIG. 1) therein. Tray 10 is horizontally oriented with exterior and interior vertically extending members projecting in perpendicular orientation with respect to tray 10 from bottomside 14 as more clearly seen in FIG. 3. Apertures 16 are recessed in from topside 12 in a shape mated to a preselected consumer good so that said consumer good is sized to fit snugly in aperture 16.

Figure 2:
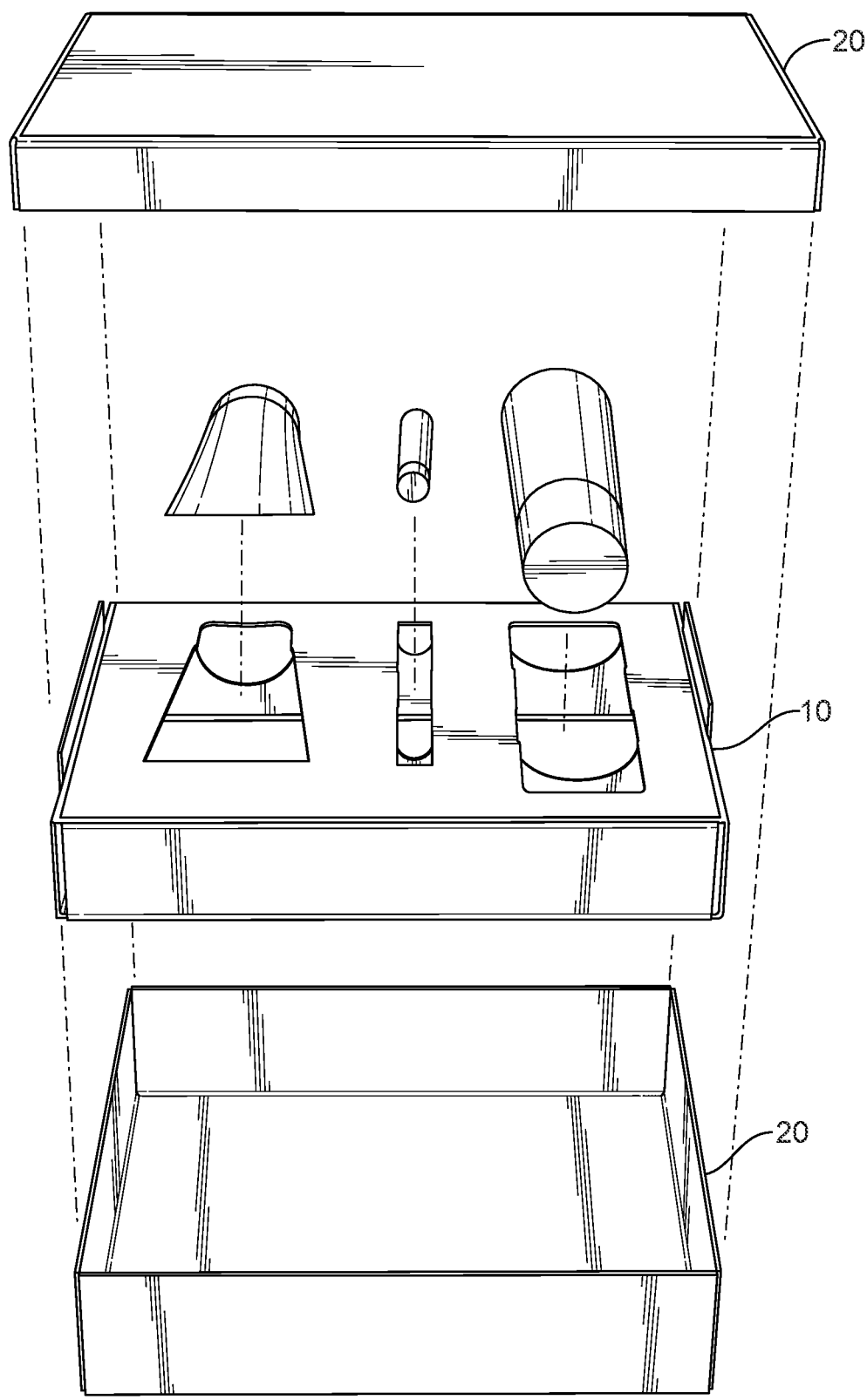
FIG. 2 shows an exploded overview perspective of the packaging insert of the present invention, including consumer goods and a container into which the insert is utilized.

With reference now to FIG. 2 of the drawings, packaging insert tray 10 is shown in exploded with view with box 20 into which it is inserted. Packaging insert 10 may be rectangular in shape as shown in FIG. 2 and fit snugly within a rectangular box 20.

Figure 3:
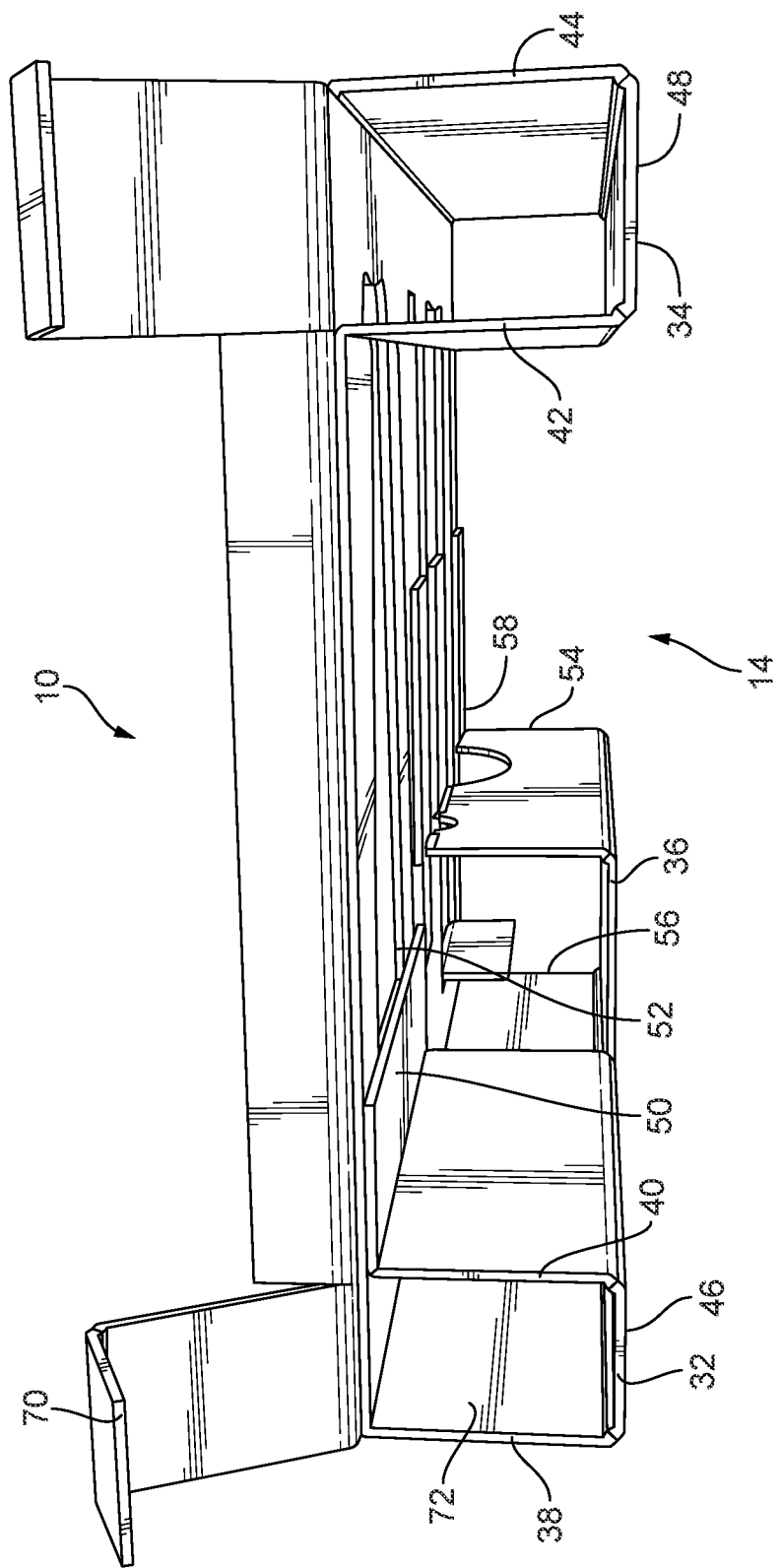
FIG. 3 shows a cross-sectional view of the packaging insert of the present invention.
Figure 4:
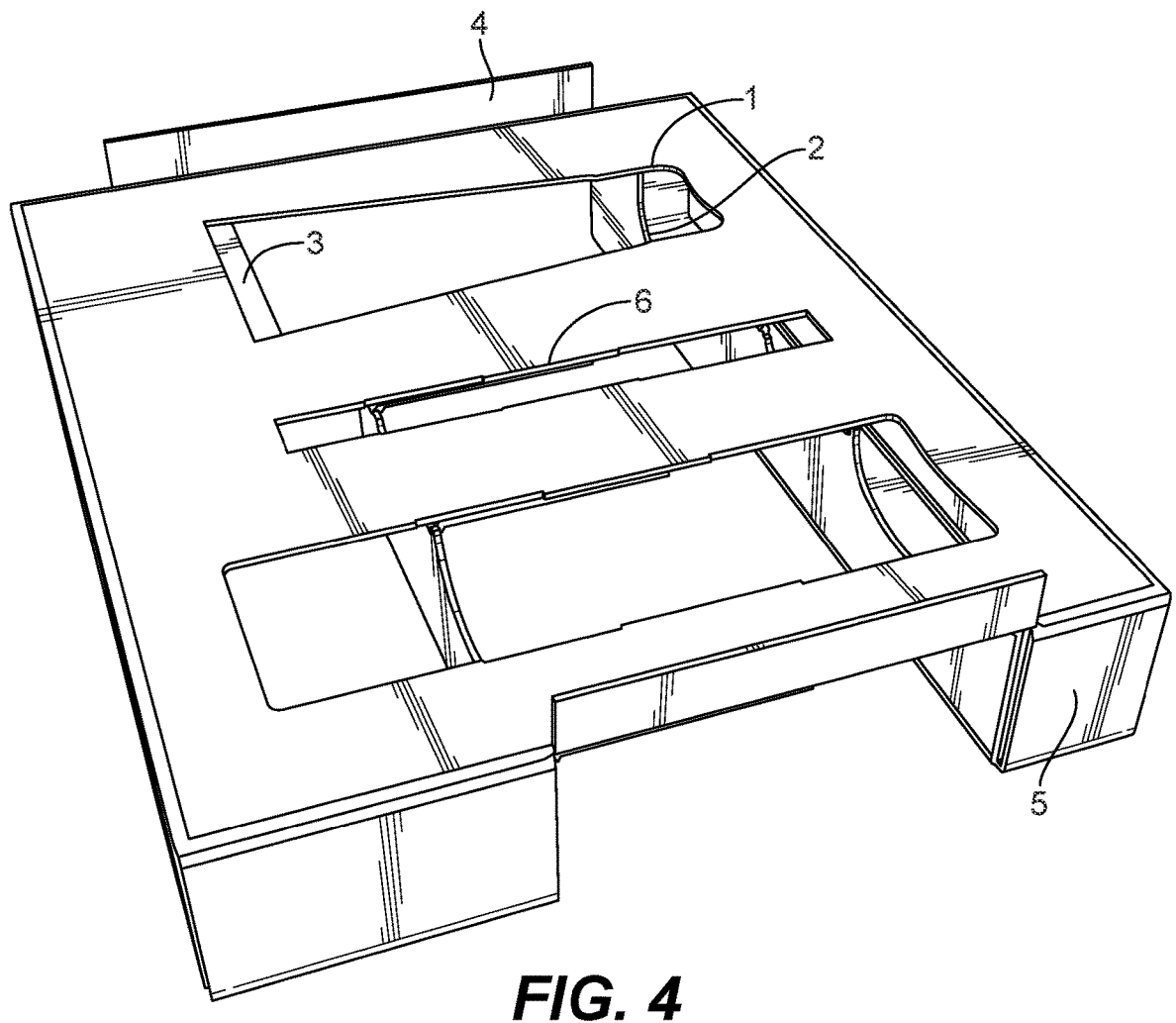
FIG. 4 shows another perspective view of the packaging insert of the present invention.

With reference now to FIG. 3 of the drawings, an exterior vertically extending members 32 and 34 are shown on either side of the rectangular shaped insert 10. An interior vertically extending member 36 is also shown protruding from bottomside 14 of packaging insert 10. Exterior vertically extending members 32 and 34 are comprised of parallel sidewalls 38 and 40 (for exterior vertically extending member 32), and 42 and 44 (for exterior vertically extending member 34), each of which are connected by bottom panels 46 and 48 perpendicularly oriented with respect to the sidewalls. An exterior vertically extending member, or sidewall 38 can also serve as a structural support along a perimeter of rectangular tray 10. It is also seen that exterior vertically extending members 32 and 34, and sidewalls 38 and 44 form opposing sides of rectangular tray 10.

Interior vertically extending member 36 also includes parallel sidewalls 54 and 56, which form sidewalls of aperture, such as an interiorly situated aperture 16 shown in FIG. 1. Horizontal flange 58 extends from parallel sidewall 54 and serves to attach it to tray bottomside 14 of tray 10.

Sidewalls 38 and 40 can be attached to bottomside 14 of packaging insert 10 by reinforcement structure, or horizontal flange 50. Similarly, sidewalls 42 and 44 are attached to bottomside 14 by reinforcement structure, or flange 52. Reinforcement structures, or flanges 50, 52, and 58 also form a multilayer reinforcement structure on bottomside 14.

Figure 5:
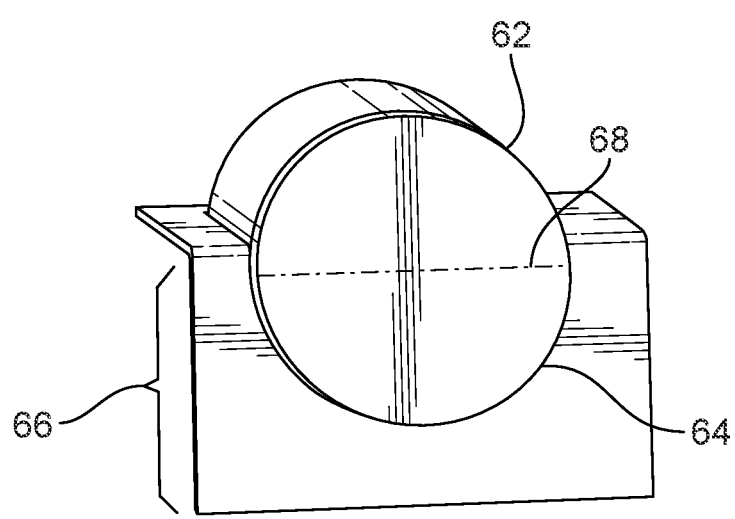
FIG. 5 is a schematic drawing showing how consumer goods are placed in the packaging insert of the present invention.

With reference now to FIG. 5 of the drawings, it can be seen how a consumer good 62, in this case cylindrically-shaped, is snugly fit into a mated aperture 64. Aperture 64 has a depth 66 which is a length of just greater than a pre-selected dimension of consumer good 62, such consumer good 62 can be snugly fit in aperture 64. A halfway-point of a pre-selected dimension of consumer good 62, in this case a cross-sectional diameter of a cylindrical object is shown at equator 68 of consumer good 62. Taking a cross-section of consumer good 62, equator 68 is a radius of the cross-section of the cylinder. Depth 66 is therefore sized according to fit consumer good 62 so that equator 68 is firmly situated in aperture 64. As can be seen, the depth 66 of aperture 64 is just longer than the radius of consumer good 62.

With further reference to FIGS. 3 and 5, a vertical portion of the folded board (also known as packaging insert tray) 10 is cut to match the cross sectional plane perpendicular to the equator of the retained object in order to precisely control the position of the object within the aperture and maximize the contact area between holder and object to minimize possible damage to object. This vertical member is located inward from the end of the object by means of multiple consecutive folds, or horizontal flanges, in the board which eventually terminates by being glued or otherwise attached to the underside, or bottomside, of the face containing the apertures. There are a minimum of two vertical members (interior and exterior) originating from opposing sides of the face portion of the board and folding downward to start the sequence of folds. Vertical member 42 terminates at the first fold of vertical member 54, and vertical member 54 terminates by being glued or attached by other means to the underside of vertical member 42, this reinforces the face portion of tray 10 by producing a multilayer reinforcement.

Retention lock specific to crimped or heat sealed tubes (such as toothpaste or creme). Tubes are difficult to retain on the crimped or heat sealed end due to their structural weakness and variation in dimension. This lock accommodates the sealed end of the tube by providing a slot for the edge to slip into and engages the tube at its seal (crimp) in the lateral direction and beyond the seal in the longitudinal direction.

Vertical flaps 70 folded upwards from substrate to engage the top of outer container in order to prevent contact between retained objects and outer container.

Assembly locks designed to retain the shape of the packaging to facilitate inserting product into the package and inserting completed assembly into outer package. The locking is accomplished by means of flap 70 being tucked into cavity 72 and preventing the folded section from returning to its flat state.

Retention tabs designed to enhance the holding strength of the interference fit of the aperture by providing additional pressure and coverage.

Examples

The present invention is further exemplified, but not limited, by the following representative examples, which are intended to illustrate the invention and are not to be construed as being limitations thereto.

A packaging insert of the present invention is made by designing, die cutting and subsequently folding and gluing as needed to obtain desired characteristics.

Thus while there have been described what are presently believed to be preferred embodiments of the invention, those skilled in the art will realize that changes and modifications may be made thereto without departing from the spirit of the invention, and it is intended to claim all such changes and modifications as fall within the true scope of the invention.

What is claimed is:

1. An insert for holding a cylindrical container, the cylindrical container having a cylindrical shape with an outer diameter extended along a longitudinal length, the insert being configured for insertion within an interior of a box having a top box portion and a bottom box portion, the insert comprising:
    a folded body formed of paper board, the folded body having a main surface having an aperture for accommodating and retaining the cylindrical container therein, the aperture having a shape defining a rectangle, the rectangle having a length and a width;
    the folded body having a folded portion defining a cradle for holding a cylindrical surface of the cylindrical container when the cylindrical container is retained in the aperture, the cradle being positioned within the aperture and offset from the main surface towards an interior of the folded body, the cradle having a truncated cylindrical shape in a plane perpendicular to a plane of the main surface such that the truncated cylindrical shape terminates at the main surface;
    wherein:
    the length of the rectangle shape of the aperture being configured to accommodate the longitudinal length of the cylindrical container;
    the truncated cylindrical shape of the cradle having a same diameter as the outer diameter of the cylindrical container; and
    the width of the aperture being smaller than the outer diameter of the cylindrical container such that the width of the aperture is configured to deform to accept the cylindrical container and to return to an un-deformed state to retain the cylindrical container in the aperture.

2. The insert according to claim 1, wherein the cradle comprises first and second cradles offset from each other along the length of the rectangle shape of the aperture.

3. The insert according to claim 1, wherein the aperture comprises a plurality of apertures and a plurality of corresponding cradles.

4. The insert according to claim 1, wherein the paper board has a thickness of more than 0.012 inches.

5. The insert according to claim 1, wherein the paper board has a grammage of more than 250 g/m$^2$.

6. An insert for holding one or more containers, the insert being configured for insertion within an interior of a box having a top box portion and a bottom box portion, the insert comprising:
    a folded body formed of paper board, the folded body having a main surface having an aperture configured to accommodate and retain each of the one or more containers therein;
    the folded body having first and second portions forming first and second tubular portions, respectively, at respective first and second opposing ends of the folded body, the folded body having a bridge supported between the first and second tubular portions;
    the bridge being a laminated structure formed by a main portion of the folded body having the main surface and by first and second extensions of the first and second tubular portions, respectively;
    wherein:
    the first tubular body comprises a first side folded away from the main surface, a second side folded from the first side to extend parallel to the main surface and a third side folded towards the main surface, the first extension being folded from the third side parallel to the main portion to form part of the laminated structure of the bridge; and
    the second tubular body comprises a fourth side folded away from the main surface, a fifth side folded from the fourth side to extend parallel to the main surface and a sixth side folded towards the main surface, the second extension being folded from the sixth side parallel to the main portion to form part of the laminated structure of the bridge.

7. The insert according to claim 6, wherein the paper board has a thickness of more than 0.012 inches.

8. The insert according to claim 6, wherein the paper board has a grammage of more than 250 g/m$^2$.

9. The insert according to claim 8, wherein the paper board has a thickness of more than 0.012 inches.

10. The insert according to claim 8, wherein the paper board has a grammage of more than 250 g/m$^2$.

11. An insert for holding one or more containers, the insert being configured for insertion within an interior of a box having a top box portion and a bottom box portion, the insert comprising:
    a folded body formed of paper board, the folded body having a main surface having an aperture configured to accommodate and retain each of the one or more containers therein;
    the folded body having first and second portions forming first and second tubular portions, respectively, at respective first and second opposing ends of the folded body;
    the folded body having first and second folded returns at respective third and fourth opposing ends of the folded body, the third and fourth opposing ends being different from the first and second opposing ends;
    wherein:
    the first tubular body comprises a first side folded away from the main surface in a first direction, a second side folded from the first side to extend parallel to the main surface and a third side folded towards the main surface;

the second tubular body comprises a fourth side folded away from the main surface in the first direction, a fifth side folded from the fourth side to extend parallel to the main surface and a sixth side folded towards the main surface; and the first and second folded returns being folded away from the main surface in a second direction opposing the first direction.

* * * * *